United States Patent
Wen et al.

(10) Patent No.: US 11,982,369 B2
(45) Date of Patent: May 14, 2024

(54) AIR VALVE STRUCTURE

(71) Applicant: TangTring Seating Technology Inc., Huizhou Guangdong (CN)

(72) Inventors: Tsun-Hsiang Wen, Taipei (TW); Shih-Chung Hsu, Taipei (TW); Jun Xie, Taipei (TW); Jian Zeng, Taipei (TW); Xian-Chang Zou, Taipei (TW)

(73) Assignee: TANGTRING SEATING TECHNOLOGY INC, Huizhou Guangdong (CN)

( * ) Notice: Subject to any disclaimer, the term of this patent is extended or adjusted under 35 U.S.C. 154(b) by 0 days.

(21) Appl. No.: 17/829,932

(22) Filed: Jun. 1, 2022

(65) Prior Publication Data
US 2023/0392707 A1 Dec. 7, 2023

(51) Int. Cl.
*F16K 31/02* (2006.01)
*F16K 31/524* (2006.01)

(52) U.S. Cl.
CPC ...... *F16K 31/025* (2013.01); *F16K 31/52408* (2013.01)

(58) Field of Classification Search
CPC . F16K 31/025; F16K 31/002; F16K 31/52408
USPC .................................................. 251/129.06
See application file for complete search history.

(56) References Cited

U.S. PATENT DOCUMENTS

| | | | | |
|---|---|---|---|---|
| 5,163,463 A * | 11/1992 | Gassman | ............... | H10N 35/00 |
| | | | | 251/129.06 |
| 7,484,528 B2 * | 2/2009 | Beyerlein | ............. | F16K 31/002 |
| | | | | 137/625.2 |
| 9,512,829 B2 * | 12/2016 | Alacqua | .................. | F16K 31/44 |
| 9,970,564 B2 * | 5/2018 | Dankbaar | ............. | B60N 2/976 |
| 10,753,494 B2 * | 8/2020 | Beuschel | ............. | F16K 11/052 |
| 10,890,268 B2 * | 1/2021 | Dörfler | ................ | F16K 31/025 |
| 11,077,781 B2 * | 8/2021 | Beuschel | ............... | B60N 2/914 |
| 11,236,839 B2 * | 2/2022 | Beuschel | ............... | F16K 31/002 |
| 11,536,256 B2 * | 12/2022 | Dankbaar | ............. | B60N 2/665 |
| 11,635,154 B2 * | 4/2023 | Beuschel | ............... | B60N 2/643 |
| | | | | 297/284.1 |

(Continued)

FOREIGN PATENT DOCUMENTS

CN 104685210 B 11/2016
CN 109296807 A 2/2019
(Continued)

*Primary Examiner* — Umashankar Venkatesan
(74) *Attorney, Agent, or Firm* — Muncy, Geissler, Olds & Lowe, P.C.

(57) ABSTRACT

An air valve structure arranged on a base comprises an air plug and a state-switching component. The air plug is arranged in an air chamber in an axial direction. The air plug includes a closing state to close the air hole, and an opening state to open the air hole. The state-switching component comprises a driving member that links the air plug, a shape-memory alloy (SMA) wire connected with the driving member, and at least one conductive member connected with the SMA wire. The driving member exerts an acting force to the air plug based on a condition of electricity provided by the conductive member for the SMA wire. The direction of the acting force is non-parallel with the axial direction and the air plug is moved and changed between the closing state and the opening state by the acting force.

11 Claims, 7 Drawing Sheets

(56) References Cited

U.S. PATENT DOCUMENTS

| | | | | |
|---|---|---|---|---|
| 2014/0374633 A1* | 12/2014 | Fuller | ............... | F16K 99/0044 |
| | | | | 251/129.06 |
| 2015/0225824 A1* | 8/2015 | Merideth | ............ | H05B 3/0004 |
| | | | | 148/563 |
| 2016/0157669 A1* | 6/2016 | Andreis | ............... | A47J 31/461 |
| | | | | 222/129.1 |
| 2018/0038514 A1* | 2/2018 | Kuszneruk | ......... | F16K 99/0044 |
| 2023/0131889 A1* | 4/2023 | Sturm | .................... | F16K 31/02 |
| | | | | 251/366 |

FOREIGN PATENT DOCUMENTS

| | | |
|---|---|---|
| CN | 109386642 A | 2/2019 |
| CN | 110345304 A | 10/2019 |
| CN | 111668612 A | 9/2020 |

* cited by examiner

AIR VALVE STRUCTURE

FIELD OF THE INVENTION

The invention relates to an air valve, particularly to an air valve controlled by shape-memory alloy wires.

BACKGROUND OF THE INVENTION

A shape-memory alloy (SMA) is a metal alloy with shape-memory effect. At a temperature lower than phase transition temperature (such as room temperature), the SMA has a martensite structure. This metallographic structure enables a shape of the SMA to be changed after receiving an external force, and maintain in the deformed state when the external force is removed. When the SMA is heated above the phase transition temperature, the metallographic structure of the SMA changes from martensite structure to austenite structure. Due to the change of the metallographic structure, the stress of the SMA is released, and the SMA returns to an original state before deformation. This phenomenon is called shape-memory effect (SME). At present, the SME of the SMA has been widely used in brake valve assemblies. The metal alloy wire shrinks after being energized and heated, so that the valve assembly can open or close a valve port according to the electrification state of the metal alloy wire.

Chinese patent No. CN 104685210B discloses a technology for braking a piston with shape-memory alloy wire. Chinese patent No. CN 104685210B provides a mechanical driver, which includes a wedge member, a control rod arranged on the wedge member and used for making the wedge member displaced relatively, a piston driven by the control rod, and an SMA connected with the wedge member. When conducted, the SMA contracts and drives the wedged member, so that the wedge member pushes the control rod to move, so that the piston opens the valve port. When the SMA is not conducted, the wedge member returns and drives the control rod, so that the piston closes the valve port. However, the mechanical driver disclosed in this patent has a complicated structure, which is not conducive to assembly.

Furthermore, Chinese patent Nos. CN 109296807A, CN 109386642A, CN 110345304A, and CN 111668612A, etc. disclose another technology for braking the valve with shape-memory gold wires. Taking Chinese patent No. CN 109296807A as an example, the valve has a valve housing, an execution assembly arranged in the valve housing, an SMA wire arranged in the valve housing and acting on the execution assembly, and a resetting assembly assembled on the execution assembly, and a circuit board on which the SMA wire is arranged. The valve housing is formed with a valve opening. When the SMA wire is not energized, the execution assembly closes the valve opening. When the SMA wire is energized, the SMA wire shrinks and presses down the execution assembly, so that the execution assembly compresses the resetting assembly and opens the valve opening. When the SMA wire is restored to a non-energized state again, the execution assembly is pushed by the resetting assembly to close the valve opening again.

However, the execution assembly disclosed by Chinese patent No. CN 109296807A is arranged on the circuit board in a vertical direction, and the displacement stroke of the execution assembly is parallel to the SMA wire, so that the height of the conventional valve housing is limited to the execution assembly and cannot be specifically reduced.

SUMMARY OF THE INVENTION

The main purpose of the invention is to solve the problem of complicated structure of the conventional valve implemented with SMA wire.

Another purpose of the invention is to solve the problem that the conventional valve implemented with SMA wire cannot be specifically shrunk.

In order to achieve the above purposes, the invention provides an air valve structure arranged on a base, the base is formed with an air chamber and includes at least one air hole communicated with the air chamber. The air valve structure comprises an air plug and a state-switching component. The air plug is arranged in the air chamber in an axial direction, and the air plug comprise a closing state to close the at least one air hole and an opening state to open the at least one air hole. The state-switching component comprises a driving member linked with the air plug, a shape-memory alloy (SMA) wire connected with the driving member, and at least one conductive member connected with the SMA wire, wherein the driving member exerts an acting force to the air plug based on a condition of electricity provided by the at least one conductive member for the SMA wire, and a direction of the acting force is non-parallel with the axial direction, and the air plug is moved and changed between the closing state and the opening state by the acting force.

In one embodiment, the driving member comprises a moving track which is non-parallel with the axial direction, and the air plug comprises a working surface which is located on a path of the moving track and is in contact with the driving member.

In one embodiment, the moving track of the driving member is perpendicular to the axial direction, and the working surface is an inclined surface.

In one embodiment, the base comprises a plurality of air holes, and one of the plurality of air holes is closed when the air plug is in the closing state.

In one embodiment, the plurality of air holes are located on the same side of the base.

In one embodiment, the air plug comprises a plug body facing the plurality of air holes and bearing the acting force, and a first elastic member assembled with the plug body, and the first elastic member provides a first return acting force for the plug body when the plug body does not bear the acting force.

In one embodiment, the state-switching component comprises a second elastic member connected with the driving member, and the second elastic member provides a second return acting force for the driving member when the driving member is not moved by the SMA wire.

In one embodiment, the state-switching component comprises two conductive members, the SMA wire is disposed across the driving member, and two ends of the SMA wire are assembled with the two conductive members, respectively.

In one embodiment, the driving member comprises an accommodating groove arranged on a top edge for the SMA wire being disposed across thereon.

In one embodiment, the plug body is formed with a hollow region which the driving member moves therein.

In one embodiment, the hollow region comprises a wide opening part in which the driving member moves, and two narrow opening parts communicated with the wide opening part for providing the SMA wire disposed therein, and the driving member exerts a force on a joint of the wide opening part and one of the two narrow opening parts upon moving.

In one embodiment, the driving member comprises a head contacted with the air plug, a neck connected to the head, and a body connected with the neck and assembled with the second elastic member.

In one embodiment, the driving member comprises an accommodating groove arranged on the head and provided for the SMA wire being disposed across.

Through the above implementation of the invention, compared with the prior art, the invention has the following characteristics: the invention controls the driving member with the conductive state of the SMA wire, and makes the direction of exerting the acting force for the air plug by the driving member intersected with the axial direction of the air plug, thereby reducing the assembly space required for the air valve structure. In addition, the air valve of the invention has the characteristic of simple structure.

DETAILED DESCRIPTION OF THE PREFERRED EMBODIMENTS

Figure 1:
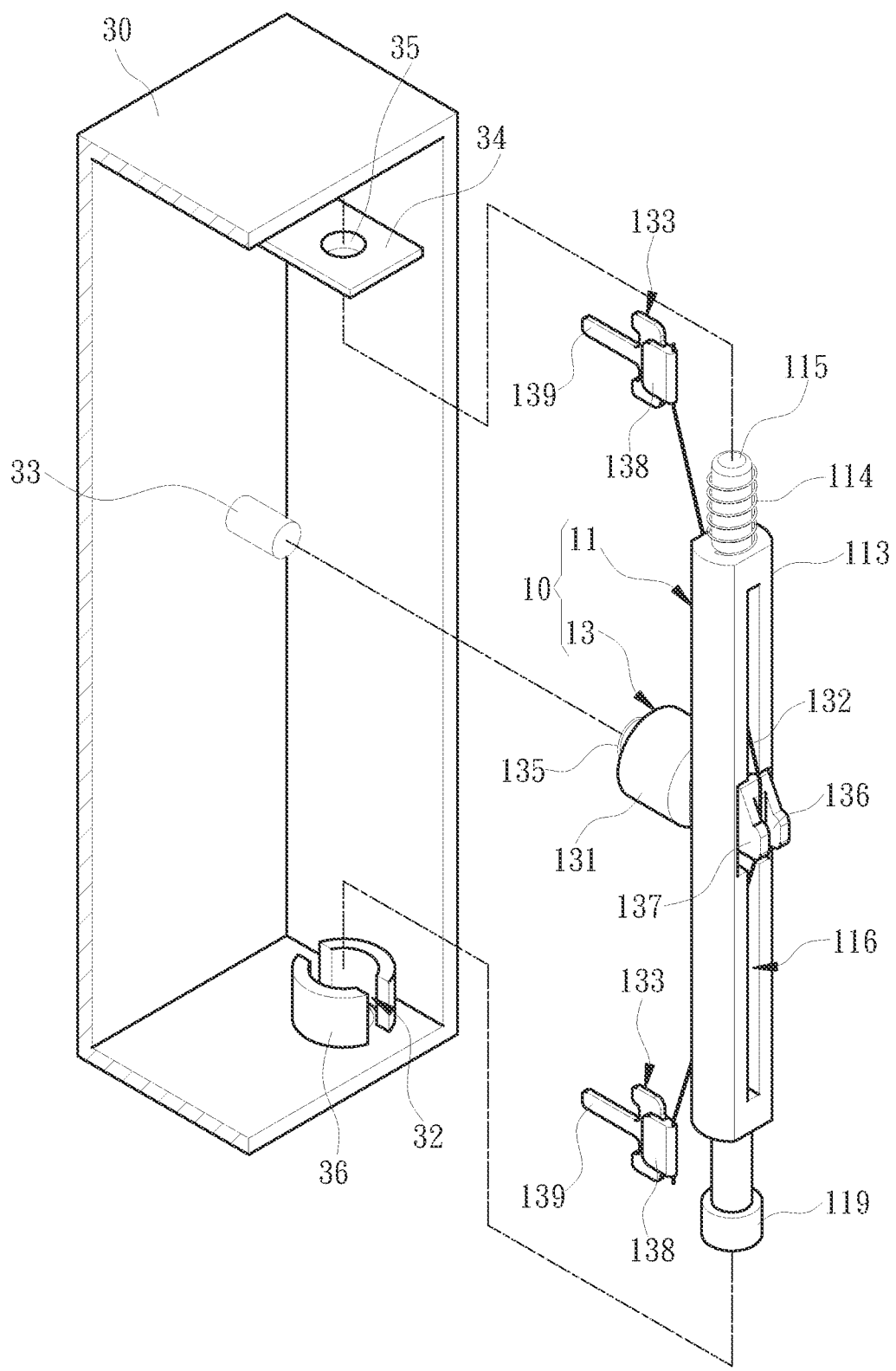
FIG. 1 is a three-dimensional structural schematic diagram of an embodiment of the invention.
Figure 2:
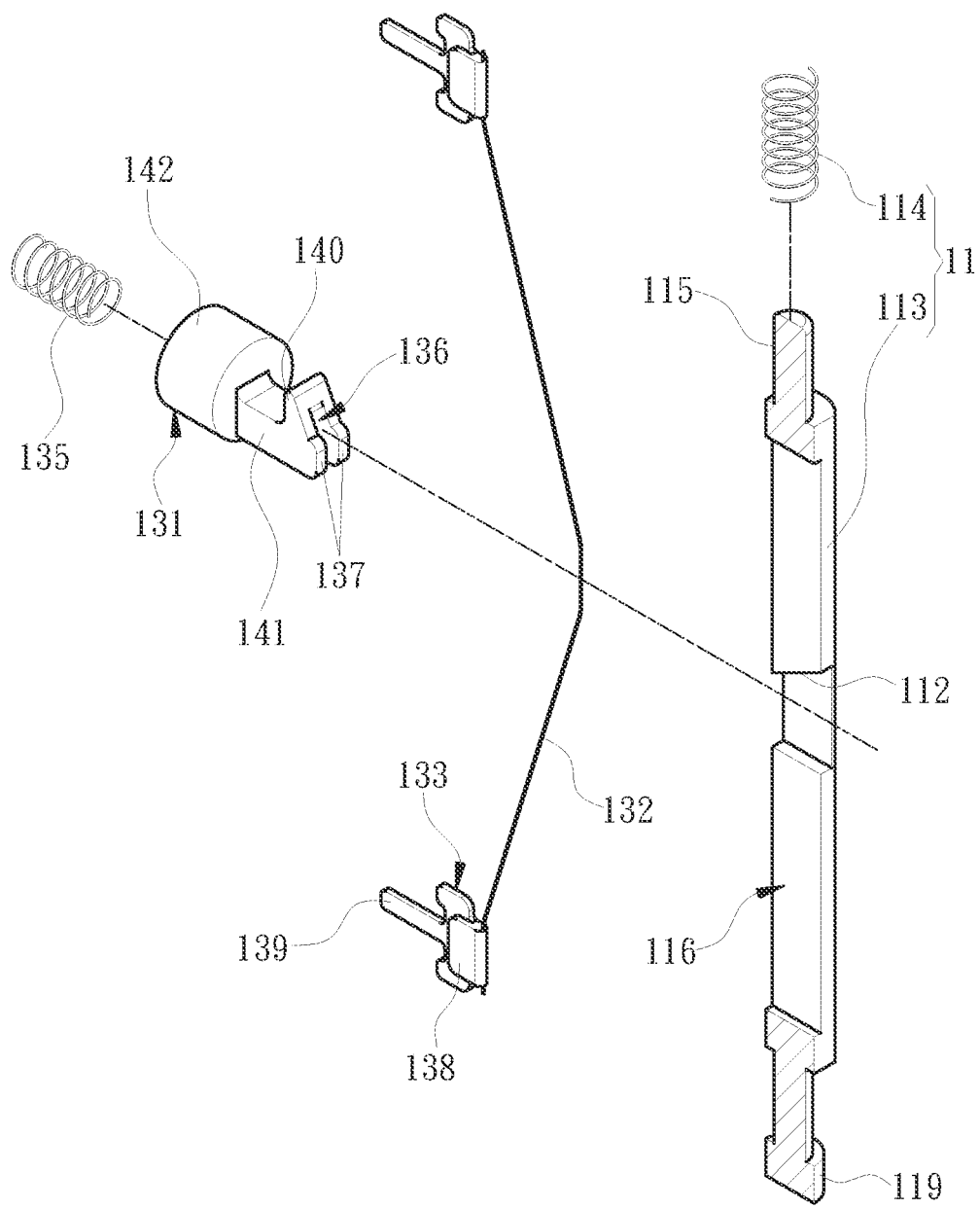
FIG. 2 is a partial structural exploded schematic diagram of an embodiment of the invention.

The detailed description and technical content of the invention are described below with reference to the drawings:

Referring to FIG. 1, FIG. 2, FIG. 3, FIG. 4 and FIG. 5, the invention provides an air valve structure 10, and the air valve structure 10 is arranged on a base 30. The base 30 is formed with an air chamber 31, and comprises at least one air hole 32 communicated with the air chamber 31. The air valve structure 10 is arranged corresponding to the at least one air hole 32 to be used to determine whether the at least one air hole 32 is closed or not.

More specifically, the air valve structure 10 comprises an air plug 11 and a state-switching component 13. The air plug 11 is arranged in the air chamber 31 in an axial direction 111. The air plug 11 has a closing state and an opening state, the air plug 11 closes the at least one air hole 32 in the closing state, and opens the at least one air hole 32 in the opening state. The air plug 11 moves on the base 30 along the axial direction 111 to be changed between the closing state and the opening state. In addition, the state-switching component 13 comprises a driving member 131, a shape-memory alloy (SMA) wire 132 and at least one conductive member 133. The driving member 131 is forced to move relative to the air plug 11, and carries the air plug 11 to move. The SMA wire 132 is contacted with the driving member 131 to force on the driving member 131. The at least one conductive member 133 is arranged on the base 30 and is connected with the SMA wire 132. The at least one conductive member 133 transmits electric power to the SMA wire 132, and a shape of the SMA wire 132 is changed according to variation of a working temperature caused by the electric power condition, thereby the driving member 131 is forced. For example, the shape of the SMA wire 132 is changed after being conducted so as to compress the driving member 131. When the electric power stops to be transmitted to the SMA wire 132, the shape of the SMA wire 132 is restored, so that the SMA wire 132 does not compress the driving member 131.

Figure 4:
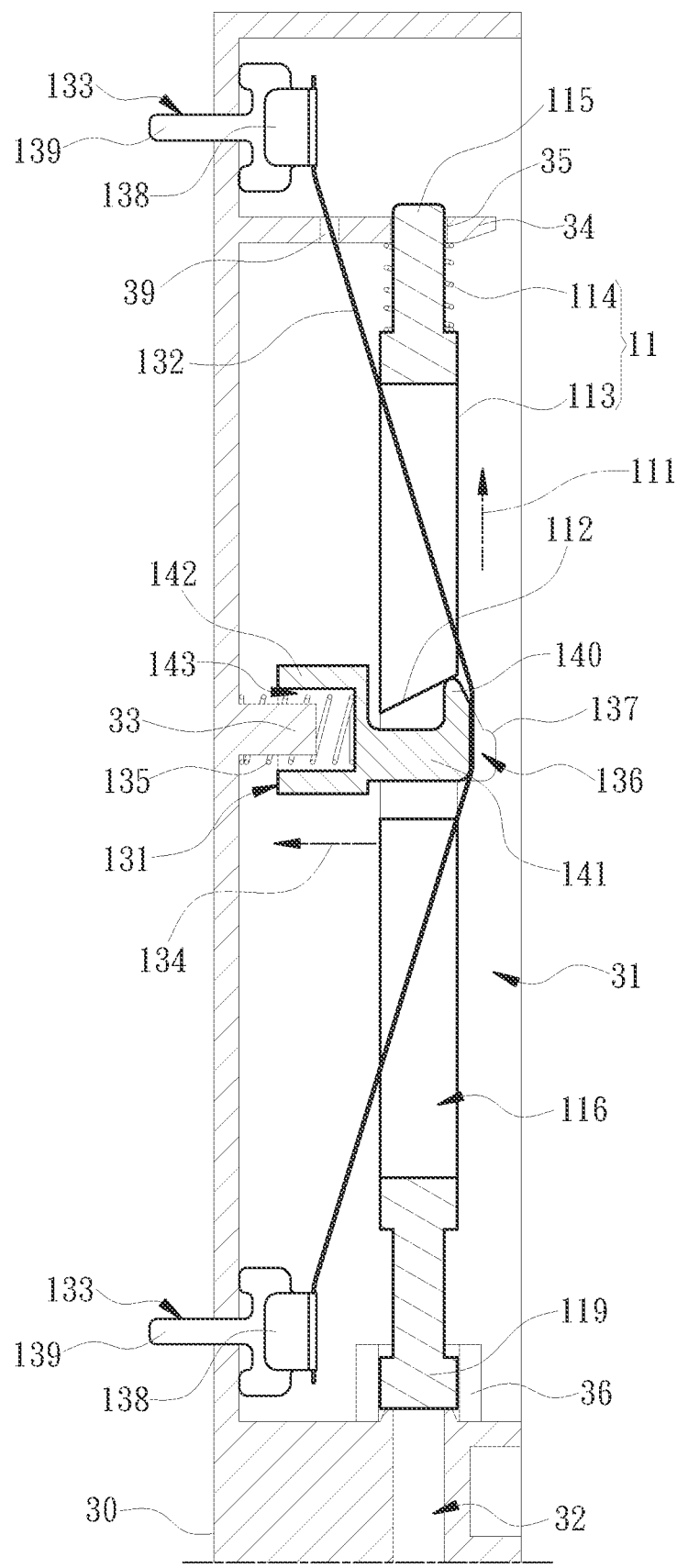
FIG. 4 is a structural sectional view of an embodiment of the invention.

A specific description with regard to the implementation of the air valve structure 10 is as follows. It is assumed that the SMA wire 132 of the invention adopts a metal alloy that the shape is changed after electrically heating. Initially, the SMA wire 132 is not conducted, and the air hole 32 is closed by the air plug 11. When the SMA wire 132 receives the electric power transmitted by the at least one conductive member 133, the shape of the SMA wire 132 is changed to compress the driving member 131, so that the driving member 131 exerts an acting force to the air plug 11. Taking an example as shown in FIG. 4, a direction of the acting force is toward left, and the air plug 11 is forced to move in a direction opposite to the at least one air hole 32 along the axial direction 111. The air plug 11 opens the at least one air hole 32 and turns into the opening state. When the electric power stops to be transmitted to the SMA wire 132, the SMA wire 132 is not conducted, and the shape of the SMA wire 132 is restored to stop compressing the driving member 131, so that the driving member 131 returns to the original position and does not exert the acting force to the air plug 11. At this time, the air plug 11 moves in a direction toward the at least one air hole 32 along the axial direction 111, and the air plug 11 closes the at least one air hole 32 and turns into the closing state.

It can be learnt from the above that the driving member 131 of the invention is controlled based on the conductive condition of the SMA wire 132. Besides, the direction of the acting force provided by the driving member 131 is non-parallel with the axial direction 111, thereby reducing the volume of the air valve structure 10 and overcoming the problem that the conventional air valve implemented with the SMA wire needs a larger assembly space. Furthermore, compared with the prior art, the air valve structure 10 of the invention has the characteristic of simple structure.

Figure 3:
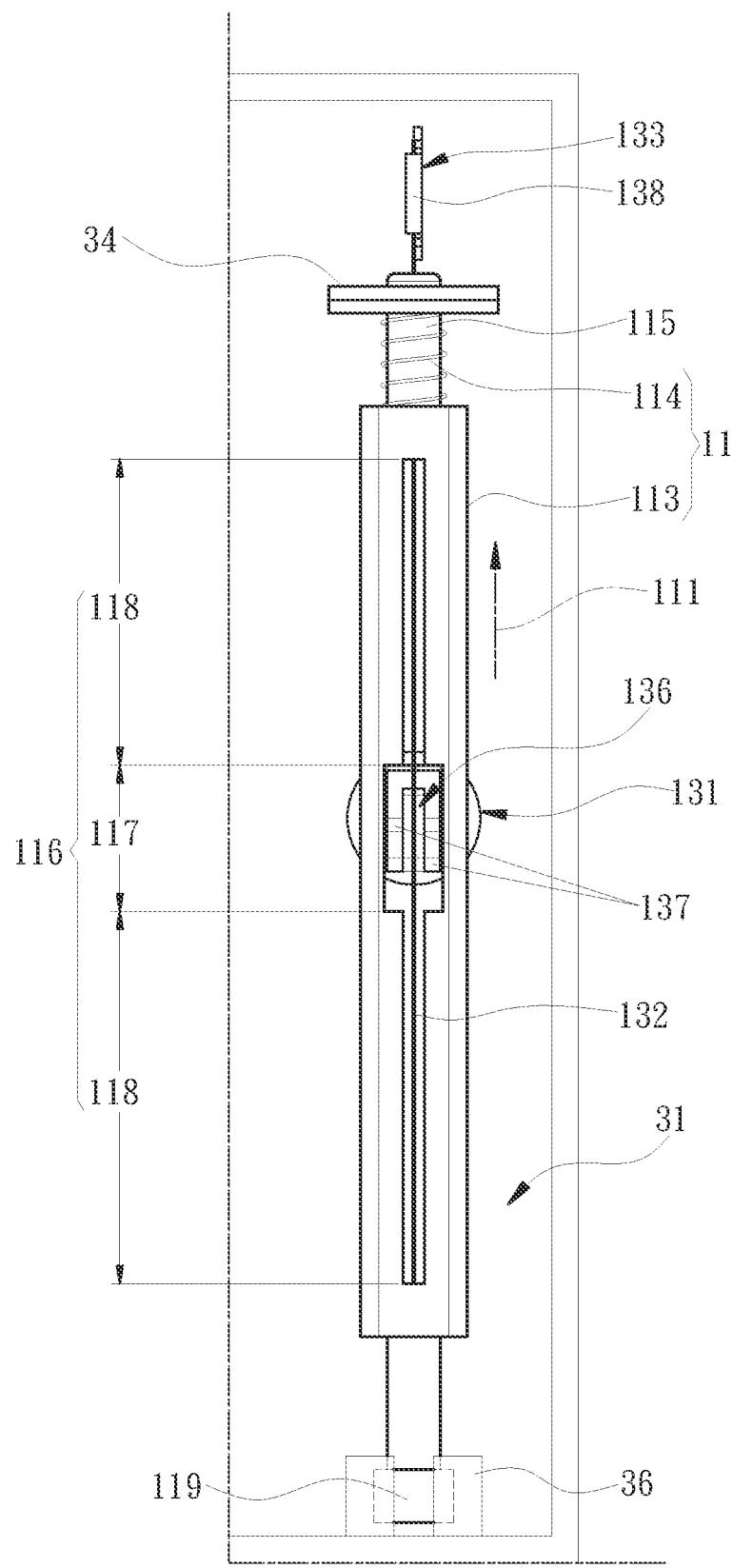
FIG. 3 is a top view of an embodiment of the invention.
Figure 5:
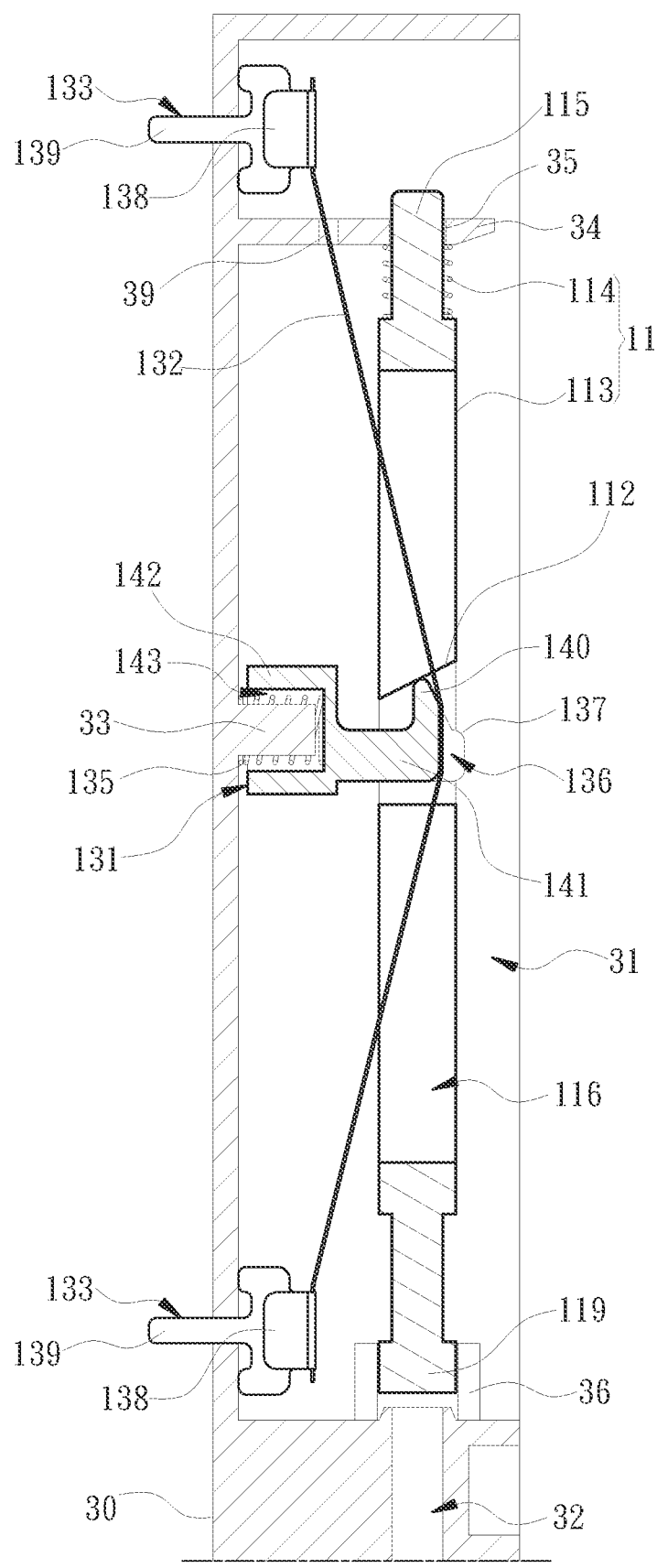
FIG. 5 is a schematic diagram of an implementation state of an embodiment of the invention.

Referring to FIG. 3, FIG. 4 and FIG. 5, the driving member 131 comprises a moving track 134 generated after the driving member 131 is forced. The moving track 134 is non-parallel with the axial direction 111. The air plug 11 includes a working surface 112 located on a path of the moving track 134. When the driving member 131 moves on the moving track 134, the driving member 131 is contacted with the working surface 112. In one embodiment, the moving track 134 is perpendicular to the axial direction 111, and the working surface 112 is an inclined surface.

In addition, in the invention, the air plug 11 comprises a plug body 113 and a first elastic member 114. The plug body 113 is provided with the working surface 112 where is facing the air hole 32. When the first elastic member 114 is assembled with the plug body 113, the plug body 113 bears the acting force, the first elastic member 114 is compressed by the plug body 113 to have a first return acting force. When the plug body 113 does not bear the acting force, the first elastic member 114 provides the first return acting force for returning the plug body 113. In one embodiment, the air plug 11 comprises a convex post 115 connected with the plug body 113. The convex post 115 is provided for arranging the first elastic member 114 to limit an assembly position of the first elastic member 114. In addition, the state-switching component 13 comprises a second elastic member 135 connected with the driving member 131. When the driving member 131 is forced by the SMA wire 132 and moved, the second elastic member 135 is compressed by the driving member 131 to have a second return acting force. When the driving member 131 is not forced by the SMA wire 132, the second elastic member 135 provides the second return acting force for returning the driving member 131.

Figure 6:
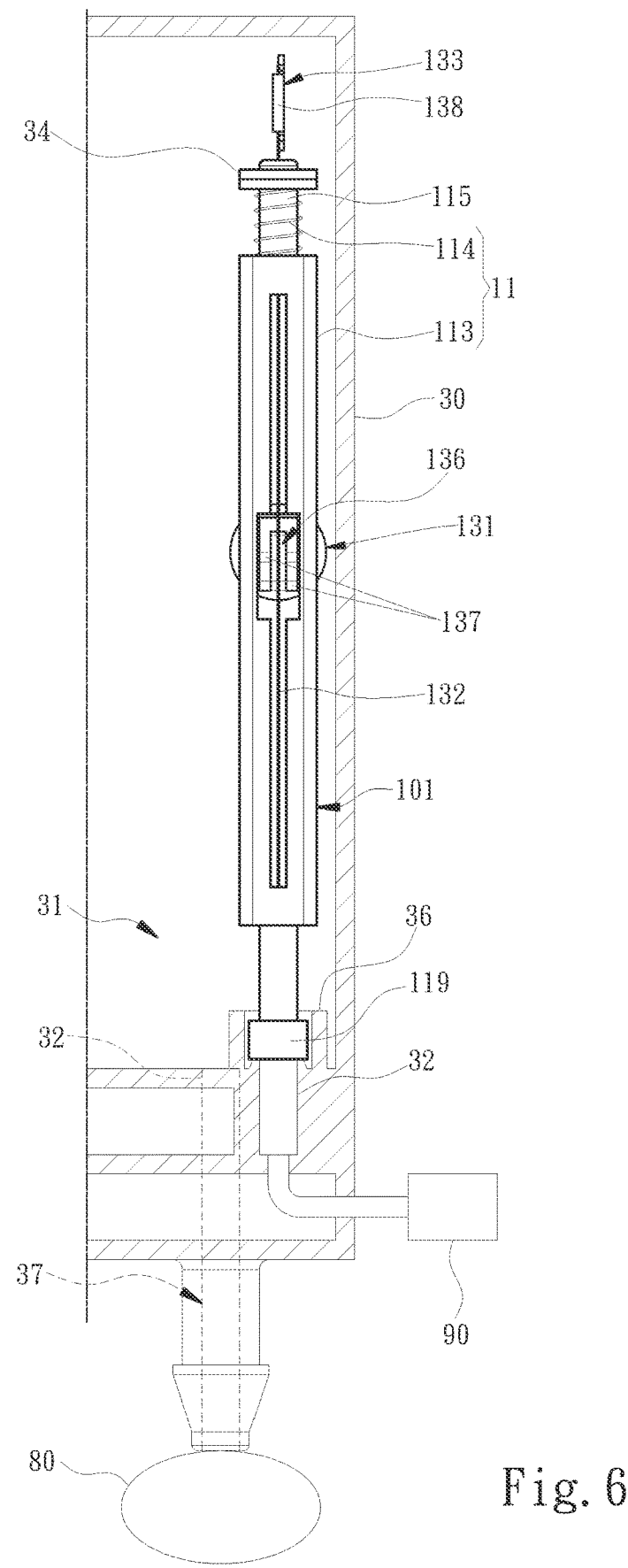
FIG. 6 is a schematic diagram of an embodiment of the invention used with an airbag.

On the other hand, referring to FIG. 1, FIG. 4, and FIG. 5, the state-switching component 13 comprises two conductive members 133 located on two opposite sides of the driving member 131, respectively. Two ends of the SMA wire 132 are assembled with the two conductive members 133, respectively. Further, referring to FIG. 6, in order to maintain the working temperature of the SMA wire 132 in the invention, when the air valve structure 10 controls an airbag 80, the base 30 is provided with a plurality of air holes 32 located at a side where the base 30 is located, and the plurality of air holes 32 and the air chamber 31 constitute a gas flow channel which communicates the airbag 80 and an air pump 90. The air valve structure 10 is arranged on the gas flow channel, and the air valve structure 10 closes one of the plurality of air holes 32 based on the state-switching component 13 to deflate or inflate the airbag 80. Accordingly, in the invention, the gas does not directly pass through the SMA wire 132 when flowing in the gas flow channel, thereby preventing the working temperature of the SMA wire 132 from being greatly reduced. In one embodiment, the base 30 has a guide channel 37 that communicates with one of the air holes 32 and allows the gas in the air chamber 31 to flow into the airbag 80.

As mentioned above, in one embodiment, the driving member 131 is formed with an accommodating groove 136 located at a top edge of the driving member 131 for the SMA wire 132 being disposed therein, and two ends of the accommodating groove 136 are open, so that the SMA wire 132 is disposed across the driving member 131. In addition, the accommodating groove 136 is formed by two retaining walls 137 of the driving member 131, and a distance between the two retaining walls 137 that jointly defines a groove width of the accommodating groove 136, and the two retaining walls 137 limit the SMA wire 132 making linear displacement relative to the driving member 131. In another embodiment, the two conductive members 133 respectively form a clamping arm 138 for fixing one end of the SMA wire 132. In another embodiment, the two conductive members 133 respectively have a pin 139, and a part of the pin 139 is exposed outside the base the pin 139 can be connected with an external power component, and the two conductive members 133 can determine whether to conduct the SMA wire 132 or not based on the control of the external power component.

As mentioned above, referring to FIG. 3, FIG. 4 and FIG. 5, the plug body 113 is formed with a hollow region 116 for the driving member 131 and the SMA wire 132 to move therein. The driving member 131 is contacted with an inner wall of the hollow region 116, wherein the inner wall is the working surface 112. In more detail, the hollow region 116 is divided into a wide opening part 117 and two narrow opening parts 118. The wide opening part 117 is provided for the driving member 131 moving therein, and the two narrow opening parts 118 are respectively connected to the wide opening part 117 for arranging two ends of the SMA wire 132. The working surface 112 is arranged at the joint between the wide opening part 117 and one of the two narrow opening parts 118, and the driving member 131 exerts a force on the joint when moving.

In addition, the driving member 131 is divided into a head 140, a neck 141 and a body 142. The head 140 is contacted with the air plug 11. In one embodiment, the head 140 forms the accommodating groove 136 where the SMA wire 132 is disposed across thereon. The neck 141 is connected with the head 140, and the neck 141 is retracted relative to the head 140. When the head 140 is contacted with the working surface 112, the neck 141 does not interfere with the working surface 112, and the neck 141 can move in the hollow region 116. The body 142 is connected with the neck 141. The body 142 is assembled with and abutted by the second elastic member 135. In order to stably assemble the body 142 and the second elastic member 135, the driving member 131 has an installation groove 143 formed on the body 142, and the installation groove 143 is provided for arranging the second elastic member 135 therein. In the invention, the body 142 covers the second elastic member 135, so that the body 142 can stably work with the second elastic member 135. In addition, in one embodiment, the base 30 is provided with a limiting post 33 for the second elastic member 135 sleeved thereon and an assembly position of the second elastic member 135 is limited.

On the other hand, the base 30 has a side wall 34 arranged opposite to the air hole 32, and an assembly hole 35 formed on the side wall 34. The side wall 34 is provided for the first elastic member 114 abutted thereon. A through hole 39 of the side wall 34 is provided for the SMA wire 132 passing through, and the assembly hole 35 is connected with the air plug 11 to limit an assembly position of the air plug 11. In addition, in another embodiment, the plug body 113 forms a bump 119 located on one side of the plug body 113 facing the air hole 32 to close the air hole 32. In addition, the base 30 is formed with at least one limiting block 36 arranged on a periphery of the air hole 32, and the limiting block 36 guides the bump 119 to close the air hole 32.

Figure 7:
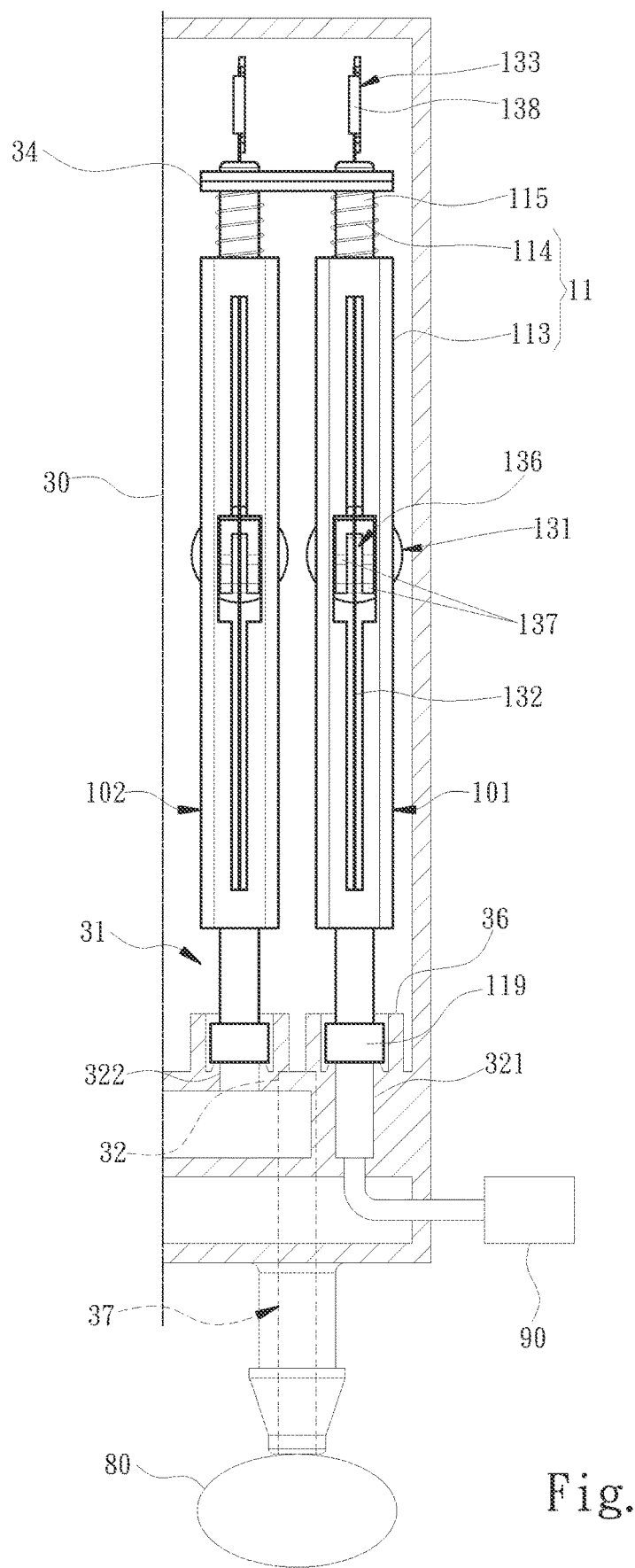
FIG. 7 is a schematic diagram of a plurality of air valve structures used with an airbag in an embodiment of the invention.

In addition to the above, referring to FIG. 7, a plurality of air valve structures 10 of the invention can also be provided, and the plurality of air valve structures 10 respectively control inflation and deflation of the airbag 80. For the convenience of subsequent illustration, the plurality of air valve structures 10 are divided into an air intake valve 101 and an exhaust valve 102, and the plurality of air holes 32 are divided into an air intake hole 321 communicated with the air pump 90 and an exhaust hole 322 located on the same side of the base 30 as the air intake hole 321. The air intake valve 101 faces the air intake hole 321, and the exhaust valve 102 faces the exhaust hole 322. In implementation, when the air intake valve 101 opens the air intake hole 321, the gas of the air pump 90 flows into the airbag 80 through the air chamber 31. When the exhaust valve 102 opens the exhaust hole 322, the gas of the airbag 80 is discharged out of the exhaust hole 322 through the air chamber 31.

What is claimed is:

1. An air valve structure, arranged on a base, the base formed with an air chamber and comprising at least one air hole communicated with the air chamber, wherein the air valve structure comprises:

an air plug, arranged in the air chamber in an axial direction, the air plug comprising a closing state to close the at least one air hole and an opening state to open the at least one air hole; and a state-switching component, comprising a driving member linked with the air plug, a shape-memory alloy (SMA) wire connected with the driving member, and at least one conductive member connected with the SMA wire, wherein the driving member is moved based on a condition of electricity provided by the at least one conductive member for the SMA wire and exerts an acting force to the air plug, and a direction of the acting force is non-parallel with the axial direction, and the air plug is moved along the axial direction and changed between the closing state and the opening state by the acting force, wherein a moving track is generated while the driving member is moved, and the moving track is perpendicular to the axial direction, and the air plug comprises a working surface which contacts the driving member moving on the moving track that is an inclined surface.

2. The air valve structure of claim 1, wherein the base comprises a plurality of air holes, and one of the plurality of air holes is closed when the air plug is in the closing state.

3. The air valve structure of claim 2, wherein the plurality of air holes are located on the same side of the base.

4. The air valve structure of claim 3, wherein the air plug comprises a plug body facing the plurality of air holes and bearing the acting force, and a first elastic member assembled with the plug body, and the first elastic member provides a first return acting force for the plug body when the plug body does not bear the acting force.

5. The air valve structure of claim 4, wherein the plug body is formed with a hollow region which the driving member moves therein.

6. The air valve structure of claim 5, wherein the hollow region comprises a wide opening part in which the driving member moves, and two narrow opening parts communicated with the wide opening part for providing the SMA wire disposed therein, and the driving member exerts a force on a joint of the wide opening part and one of the two narrow opening parts upon moving.

7. The air valve structure of claim 4, wherein the state-switching component comprises a second elastic member connected with the driving member, and the second elastic member provides a second return acting force for the driving member when the driving member is not moved by the SMA wire.

8. The air valve structure of claim 7, wherein the state-switching component comprises two conductive members, the SMA wire is disposed across the driving member, and two ends of the SMA wire are assembled with the two conductive members, respectively.

9. The air valve structure of claim 8, wherein the driving member comprises an accommodating groove arranged on a top edge for the SMA wire being disposed across thereon.

10. The air valve structure of claim 7, wherein the driving member comprises a head contacted with the air plug, a neck connected to the head, and a body connected with the neck and assembled with the second elastic member.

11. The air valve structure of claim 10, wherein the driving member comprises an accommodating groove arranged on the head and provided for the SMA wire being disposed across.

* * * * *